Dec. 29, 1970  J. H. DOZOIS  3,551,002
RESTRAINT BELT RETRACTOR BIASING RELEASE
Filed May 21, 1969

INVENTOR.
James H. Dozois
BY
Herbert Furman
ATTORNEY united States Patent Office 3,551,002
Patented Dec. 29, 1970

1

3,551,002
RESTRAINT BELT RETRACTOR BIASING RELEASE
James H. Dozois, Harper Woods, Mich., assignor to General Motors Corporation, Detroit, Mich., a corporation of Delaware
Filed May 21, 1969, Ser. No. 826,408
Int. Cl. B60r 21/10
U.S. Cl. 280—150                                4 Claims

ABSTRACT OF THE DISCLOSURE

A biasing release for a restraint belt retractor includes a retractor roller rotatably attached to the free end of interconnected bent leg portions of a wire retainer. The retainer is pivotally attached to a spring biased carrier which slideably mounts within an elongated housing for reciprocal movement therealong. One end of a restraint belt is anchored adjacent an opening in the housing. The belt passes around the retractor roller between the retractor roller and carrier, to permit the retractor roller to form a bight in the belt and retract the belt into the housing when not in use. Extension of the belt straightens the bight, moving the retractor roller out of the housing in an extending direction on the belt and around a guide roller attached to the housing adjacent the opening thereof. The spring biasing acting through the bent leg portions of the retainer continues the movement of the retractor roller on the guide roller in a retracting direction until the bent leg portions of the retainer engage the guide roller on either side of the belt to halt the movement of the roller. Swinging movement of the belt away from the guide roller moves the roller in an extending direction on the belt to a position thereon where the retractor roller forms a bight in the belt and retracts the belt into the housing.

---

This invention relates to restraint belt retractors and more particularly to a biasing release for a restraint belt retractor which releases a fully extended belt from the retracting force thereon.

Conventionally a restraint belt retractor includes an elongated housing having an opening therein adjacent the achored end of the belt and a spring biased retractor roller around which the belt is passed. The retractor roller forms a bight in the belt and moves the belt to a stored position within the housing. When the occupant withdraws the belt, the bight straightens, moving the retractor roller against the spring biasing toward the opening. When the occupant releases the belt, the spring biased retractor roller moves the belt back to the stored position.

The biasing release of this invention includes a retractor roller, a roller mounting means, and a guide means, cooperable with each other, for releasably holding the roller when the belt is fully extended to thereby free the fully extended belt from the spring biasing. In the preferred embodiment, the retractor roller is rotatably attached to a retainer. The retainer is pivotally attached to a spring biased carrier which slideably mounts within an elongated housing for reciprocal movement therealong. One end of a restraint belt is anchored adjacent an opening in the housing. The belt passes around the retractor roller, between the retractor roller and carrier, to permit the retractor roller to form a bight in the belt and retract the belt into the housing when not in use. Extension of the belt straightens the bight, moving the retractor roller out of the housing in an extending direction on the belt and around a guide roller attached to the housing adjacent the opening thereof. The spring biasing acting through the leg portions of the retainer continues the movement of the retractor roller on the guide roller in a retracting direction until the retainer engages the guide roller on either side of the belt to halt the movement of the roller. Swinging movement of the belt away from the guide roller moves the roller in an extending direction on the belt to a position thereon where the retractor roller forms a bight in the belt and retracts the belt into the housing.

Therefore, it is an object of this invention to provide a biasing release for releasably holding a spring biased retractor roller of a restraint belt retractor when the belt is fully extended to free the fully extended belt from the biasing force of the retractor roller. It is a further object of this invention to provide such a biasing release wherein the retractor roller is released by a swinging movement of the fully extended belt. It is another object of this invention to provide such a biasing release wherein the spring biased retractor roller and its mounting means cooperate with a guide means on the retractor to free the fully extended belt from the biasing force of the roller. It is yet another object of this invention to provide such a biasing release wherein the guide means include a guide roller mounted adjacent the opening of the retractor.

These and other objects of the invention will become apparent from the following detailed description and drawings in which.

Figure 1:
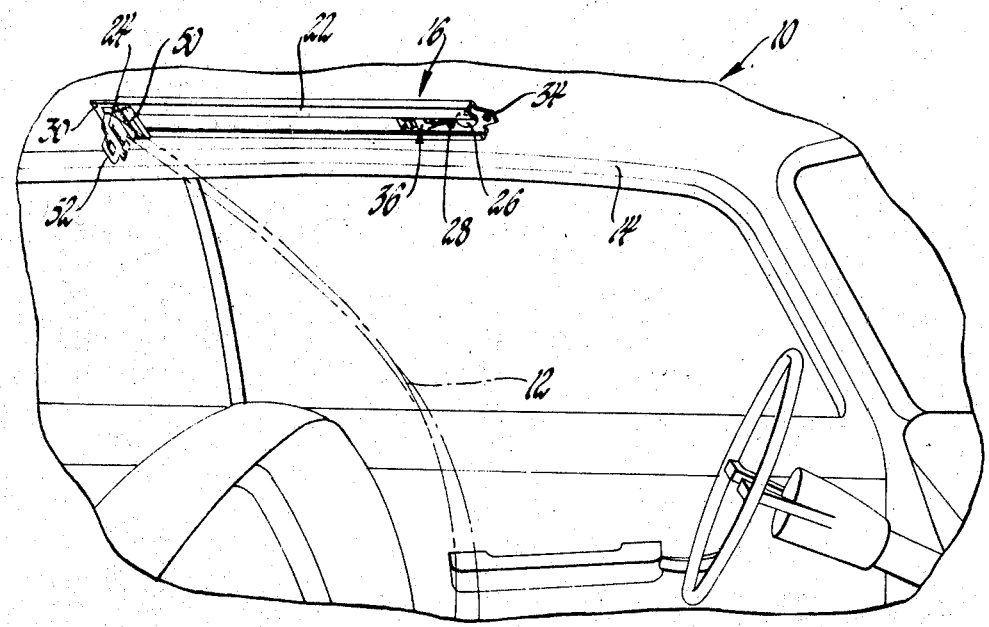
FIG. 1 is a partially cut away view of a vehicle interior having a restraint belt retractor according to this invention mounted therein.

Referring now to FIG. 1, a conventional vehicle body 10 has a conventional shoulder belt 12 mounted to the roof side rail 14 by a restraint belt reactor 16 embodying a biasing release according to this invention. While the biasing release of this invention is shown and described in conjunction with a shoulder belt retractor, it should be understood that the biasing release may be used with any retractor having a retractor roller.

Figure 2:
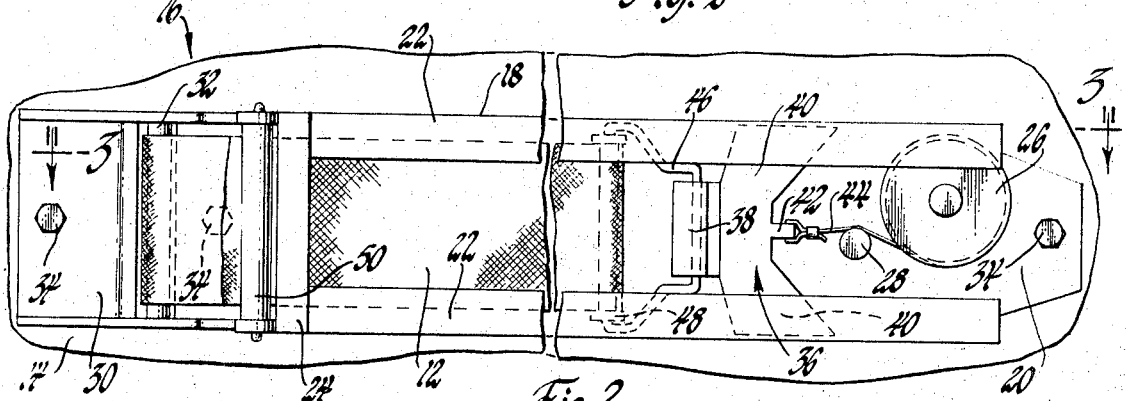
FIG. 2 is an enlarged broken away view of a portion of FIG. 1.
Figure 3:
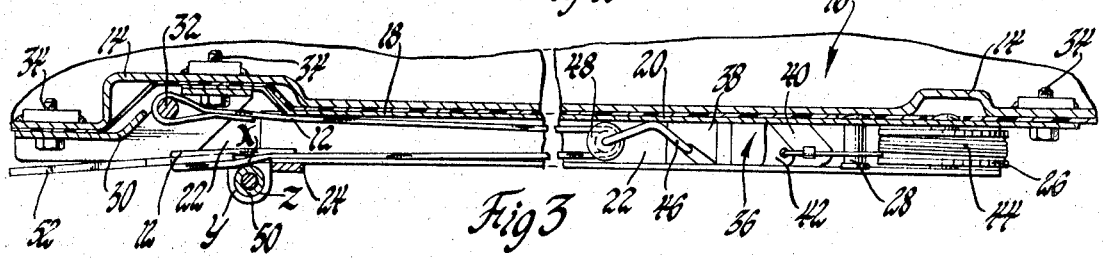
FIG. 3 is a view taken along the line 3—3 of FIG. 2 showing the belt in the retracted position.

Referring now to FIGS. 2 and 3, the restraint belt retractor 16 includes a housing 18 of an elongated C-shaped cross section having a flat base portion 20 and inwardly flanged side portions 22 which form an elongated guide channel. A reinforcing brace 24 extends between the flanges of the side portions 22 adjacent the left hand end thereof to form an opening of the housing 18. Adjacent the right hand end of the base portion 20 is rotatably mounted a cable reel 26 which is biased in a counter clockwise direction by a torsion spring, (not shown). A guide post 28 is also mounted to the base portion 20 with its surface being tangential to the centerline of the housing 18.

An anchor 30 provides a rod 32 around which one end of the shoulder belt 12 is looped to secure it to the vehicle body 10. The anchor 30 is mounted over the left hand end of the housing 18 adjacent the opening thereof. Anchor bolts are screwed into holes in conventional tapping plates to securely mount both the anchor 30 and the left hand end of the housing 18, to the roof side rail 14 as well as the right hand end of the housing 18.

A roller carrier 36 slideably mounts within the elongated guide channel of housing 18 for reciprocal movement therealong. The carrier 36 includes a left hand slotted lug 38, two oppositely extending side portions 40 for engaging the side portions 22 to guide the carrier 36, and a right hand apertured lug 42 for attaching a cable thereto. A flexible wire cable 44 has one end attached to the lug 42 and the other end attached to the reel 26, with the intermediate portion thereof sliding along the surface of the guide post 28, to provide a centrally acting biasing force to the right in a retracting direction on the carrier 36.

A roller retainer 46 is hooked to lug 38 and rotatably attaches a retractor roller 48 to the carrier 36. The retainer 46 includes two connected oppositely extending bent leg portions, best shown in FIG. 3, for a purpose which will be later described.

The brace 24 has at either end spaced apertured lugs which rotatably mount a guide roller 50 across the opening of housing 18 for guiding the restraint belt into and out of the housing. The guide roller 50 is axially longer than the belt 12 is wide for a reason which will appear later.

The restraint belt 12 runs from the anchor 30 into the opening of housing 18, around the retractor roller 48 to form a bight in the belt 12 and back out the opening of the housing 18 on the guide roller 50. The free end of the belt has attached thereto a conventional D-ring 52 which (as shown in FIG. 3) rests against the opening of housing 18 when the belt 12 is retracted.

Figure 4:
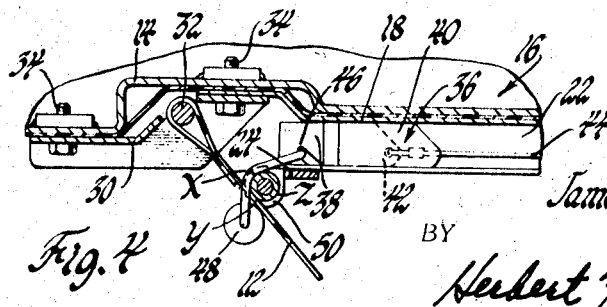
FIG. 4 is a view of a portion of FIG. 3 showing the restraint belt in a fully extended position.

To use the belt 12, the belt is moved from the retracted position of FIG. 3 to the extended position of FIG. 4 by the occupant grasping the D-ring 52 and pulling the belt 12 from the housing 18. As the belt 12 is withdrawn, the belt rotates guide roller 50 and retractor roller 48 about their respective pivots and the straightening bight in the belt 12 moves retractor roller 48 in the extending direction toward the opening of the housing 18 against the biasing force of the torsion spring in reel 26.

As the retractor roller 48 is moved in the extending direction out of the housing 18 by the straightening bight of the belt 12, it first moves on the belt 12 over a surface portion X of the guide roller 50 adjacent the opening. As the belt 12 continues to be withdrawn, the belt locally assumes the shape of the guide roller 50 to roll the retractor roller 48 on the belt over a return bent juncture surface portion Y of the guide roller 50 and as best shown in FIG. 4, in the retracting direction on the belt to a remote surface portion Z of the guide roller 50. The movement of the retractor roller 48 on the belt around the surface portions of the guide roller 50 is possible because, as shown in FIG. 4, of the connected oppositely extending leg portions of the retainer 46. The leg portions of retainer 46 engage the surface of guide roller 50 on either side of the belt 12 to prevent the retractor roller 48 from continuing in the retracting direction on the belt 12 along the remote surface portion Z of the guide roller 50 as it is urged by the biasing force. Thus, the biasing force of the torsion spring of reel 26 and the connected oppositely extending bent leg portions of retainer 46 together hold the retractor roller 48 against the belt 12 on the remote surface portion Z of guide roller 50 to free the fully extended shoulder belt 12 from the retracting action of the retractor 16.

The shoulder belt 12 will remain free of the biasing action of the torsion spring of the reel 26 as long as the belt 12 remains in use. When the occupant no longer desires to use the shoulder belt 12, he releases it conventionally and swings the free end toward the rear of the vehicle to free the biasing release by moving the retractor roller 48 in the extending direction from its position on the belt 12 on the surface portion Z of the guide roller 50 to a position on the belt 12 on the surface portion X of the guide roller 50 enabling the biasing action of the torsion spring of reel 26 acting through cable 44 carrier 36 and retainer 46, to form a bight in the shoulder belt 12. The retractor roller 48 after the bight is formed, moves the shoulder belt 12 in the retracting direction into the stored position within housing 18 until the belt is again withdrawn by the occupant for use.

In order to aid in better understanding of the coaction between the belt 12, the guide roller 50, the retractor roller 48, the retainer 46 and the biasing force which co-act to provide the biasing release that frees the fully extended belt 12 from the retractor action, the following explanation is presented. As the retractor roller 48 rolls on the belt 12 over the guide roller 50, an effective line of engagement is established between the surface of the retractor roller 48 and the surface of belt 12. This effective line of engagement lies in a plane containing the axes of the retractor roller 48 and the guide roller 50. This plane pivots about the axis of the guide roller 50 as the retractor roller 48 moves along the surface of the belt 12 and around the guide roller 50 giving the effective line of engagement an arcuate path.

In the meantime, the biasing action of the torsion spring of reel 26 also creates a plane. This plane, called the spring plane contains the axis of the guide roller 50 and the pivotal axis between the carrier 36 and the retainer 46. As the carrier 36 slides toward the opening in the housing 18, the spring plane pivots about the axis of the guide roller 50 and approaches a limit position. The limit position is reached when the pivotal axis between the carrier 36 and the retainer 46 is in its nearest position to the opening. The limit position establishes a limit of the spring planes containing the axis of the guide roller 50 and the pivot axis of the retainer 46 to the carrier 36. This limit spring plane intersects the arcuate path of the effective line of engagement to divide the arcuate path into two halves. When the effective line of engagement is in the limit spring plane, the retractor roller 48 is in a neutral position but when the effective line of engagement is on the opening side of the limit spring plane, the biasing action of the reel 26 acts in the retracting direction to move the effective line of engagement clockwise through arcuate path and pulls the retractor roller 48 toward the opening in the housing 18. Likewise when the effective line of engagement is on the remote side of the limit spring plane from the opening, the biasing action acts in the retracting direction to move the effective line of engagement counterclockwise through its arcuate path and pulls the retractor roller 48 away from the opening in the housing 18.

The straightening of the bight in belt 12 moves the retractor roller 48 in the extending direction and so moves the effective line of engagement along its arcuate path. The fully extended belt 12 approximates a flat plane as seen in FIG. 4, so that the effective line of engagement must be on a plane normal to the belt 12. The fully extended belt passes obliquely to the path of the retainer 46 pivot thus giving an optimum normal plane to which the spring biasing will move the retractor roller 48 on the belt 12. The belt 12 then is so positioned that the effective line of engagement in this optimum normal plane is to the remote side of the limit spring plane from the opening, to move the retractor roller 48 to the remote side of the limit spring plane by straightening the belt 12.

Thus, the straightening bight of the belt 12 moves the effective line of engagement to the remote side of the spring limit plane from the opening as it moves the retractor roller 48 around the guide roller 50. The biasing action of the reel 26 continues the movement of the retractor roller 48 around the belt roller 50 in the retracting direction until the legs of the retainer 46 engage the belt roller 50 to stop this movement.

Also, the swinging of the free end of the belt 12 towards the rear of the vehicle moves the effective line of engagement to the adjacent side of the spring limit plane to the opening as it moves the retractor roller 48 back around the guide roller 50. The biasing action of the reel 26 similarly continues the movement of the retractor roller 48 in the retracting direction until the bight is formed and the belt 12 is in the stored position within housing 18.

The surface portion X, then, is on the opening side of the limit spring plane, the juncture surface portion Y is in the limit spring plane on the surface of the guide roller 50 and the surface portion Z is on remote side of the limit spring plane from the opening.

It should be evident that rod 32 of the anchor 30 must be spaced far enough from the opening of the housing 18 that the tangential engagement of the fully extended belt 12 with the surface of the guide roller 50 is on remote surface portion Z thereof and thereby to the remote side of limit spring plane.

It should be noted that the guide roller 50 could be replaced by any element having a first surface portion adjacent the opening, joined by a return bent juncture surface portion to a second surface portion spaced from the first surface portion and remote the opening in the positions previously described. However, the roller used herein as well as having the required portions also rotates as the belt 12 is drawn over it to reduce the friction and wear thereon.

Thus, the biasing release of this invention releases a fully extended restraint belt from the biasing force of a restraint belt retractor and yet reapplies the biasing force to the belt to retract it to a stored position within the housing of the retractor when the belt is no longer in use.

I claim:

1. In a vehicle body having a compartment opening to the interior of the body and a restraint belt having one end anchored to the body and the other end free, the belt being movable to a stored position within the compartment by a belt retractor roller when attached to a biasing means providing continuous biasing in a retracting direction away from the opening and into the compartment, a biasing release comprising, retainer means rotatably attached to the retractor roller and attached to the biasing means, the belt passing around the retractor roller between the retractor roller and the biasing means, guide means mounted adjacent the opening for guiding the belt through the opening and having a first surface portion adjacent the opening joined by a return bent juncture surface portion to a second surface portion spaced from the first surface portion and remote the opening, full extension of the free end of the belt straightening the bight in the belt against the one end and moving the retractor roller in an extending direction against the action of the biasing means, the belt moving the retractor roller in an extending direction on the belt along the first surface portion and on the belt around the juncture surface portion, the biasing means moving the retractor roller in the retracting direction on the belt from the juncture surface portion on the belt along the second surface portion, and means limiting the movement of the retractor roller in the retracting direction on the belt along the second surface portion under the action of the biasing means to releasably hold the retractor roller on the belt on the second surface portion and free the straightened belt from the action of the biasing means, movement of the straightened belt about the one end and away from the guide means moving the retractor roller in the extending direction on the belt along the second surface portion and on the belt around the juncture surface portion against the action of the biasing means, the biasing means moving the retractor roller in the retracting direction on the belt from the juncture surface portion on the belt along the first surface portion and into the compartment to form a bight in the belt and move the belt to the stored position.

2. The biasing release as recited in claim 1 in which the means limiting the movement of the retractor roller in the retracting direction on the belt along the second surface portion is the retainer means engaging the guide means.

3. In a vehicle body having a compartment opening into the interior of the body and a restraint belt having one end thereof anchored to the body adjacent the compartment opening and the other end free, the belt being movable to a stored position within the compartment by a belt retractor roller when attached to a biasing means providing continuous biasing in a retracting direction away from the opening and into the compartment, a biasing release comprising, a retainer rotatably attached to the retractor roller and attached to the biasing means, the belt passing around the retractor roller between the retractor roller and the biasing means, a guide roller rotatably mounted adjacent the opening for guiding the belt through the opening, full extension of the free end of the belt straightening the bight in the belt against the one end and moving the retractor roller in an extending direction out of the compartment against the action of the biasing means, the belt moving the retractor roller in an extending direction on the belt along the guide roller adjacent the opening to a position on the belt along the guide roller adjacent the opening enabling the biasing means to move the retractor roller in a retracting direction on the belt along the guide roller remote the opening, and means limiting the movement of the belt retractor roller in the retracting direction along the guide roller remote the opening to releasably hold the retractor roller on the belt along the guide roller remote the opening and free the straightened belt from the action of the biasing means, movement of the straightened belt about the one end and away from the guide roller moving the retractor roller in an extending direction against the action of the biasing means on the belt along the guide roller remote the opening to a position on the belt along the guide roller adjacent the opening enabling the biasing means to move the retractor roller in a retracting direction on the belt along the guide roller adjacent the opening and into the compartment, to form a bight in the belt and move the belt into the stored position.

4. The biasing release as recited in claim 3 in which the means limiting the movement of the belt retractor in the retracting direction along the guide roller remote the opening is the retainer means engaging the guide roller.

References Cited

UNITED STATES PATENTS

| | | | |
|---|---|---|---|
| 3,032,374 | 5/1962 | Robinson et al. | 297—388 |
| 3,107,121 | 10/1963 | Mougey | 297—388 |
| 3,128,124 | 4/1964 | Fredericks et al. | 297—388 |
| 3,400,977 | 9/1968 | Jones | 280—150XR |

LEO FRIAGLIA, Primary Examiner

L. J. PAPERNER, Assistant Examiner

U.S. Cl. X.R.

242—47.5; 297—388